(12) United States Patent
Yamano

(10) Patent No.: US 10,061,100 B2
(45) Date of Patent: *Aug. 28, 2018

(54) ZOOM LENS DEVICE

(71) Applicant: Yamano Optical Co., Ltd., Kanagawa (JP)

(72) Inventor: Shiro Yamano, Kanagawa (JP)

(73) Assignee: YAMANO OPTICAL CO., LTD., Sagamihara-shi (JP)

(*) Notice: Subject to any disclaimer, the term of this patent is extended or adjusted under 35 U.S.C. 154(b) by 516 days.

This patent is subject to a terminal disclaimer.

(21) Appl. No.: 14/337,405

(22) Filed: Jul. 22, 2014

(65) Prior Publication Data

US 2014/0327972 A1 Nov. 6, 2014

Related U.S. Application Data

(63) Continuation of application No. 13/157,649, filed on Jun. 10, 2011, now Pat. No. 8,817,384.

(51) Int. Cl.
*G02B 15/14* (2006.01)
*G02B 7/10* (2006.01)
(Continued)

(52) U.S. Cl.
CPC ............... *G02B 7/10* (2013.01); *G02B 7/008* (2013.01); *G02B 15/14* (2013.01); *G02B 27/0068* (2013.01)

(58) Field of Classification Search
CPC ........... G02B 7/02; G02B 7/021–7/023; G02B 7/028; G02B 7/04
(Continued)

(56) References Cited

U.S. PATENT DOCUMENTS 5,124,738 A 6/1992 Yamashita
5,600,496 A * 2/1997 Mori ................... G02B 15/14
359/820

(Continued)

FOREIGN PATENT DOCUMENTS

JP 11-064713 3/1999
JP 11-205655 7/1999
(Continued)

OTHER PUBLICATIONS

Dec. 1, 2015 Office Action issued in Japanese Patent Application No. 2015-061565.

(Continued)

*Primary Examiner* — Robert E Tallman
(74) *Attorney, Agent, or Firm* — Oliff PLC

(57) ABSTRACT

A zoom lens device includes a focusing lens group arranged on an object side, and a variator lens group next thereto, and a temperature sensor. The focusing lens group includes a focusing lens, and a temperature-based correction lens for correcting changes in focal point caused by temperature changes around the focusing lens group. The temperature-based correction lens is moved by a temperature-based correction lens driving mechanism along an optical axis to a position determined by a temperature detected by the temperature sensor, independently of the positions of the focusing lens or variator lens group. Thereby, the zoom lens device is capable of favorably correcting defocus of the lens group caused by an ambient temperature change with a simple correcting mechanism.

3 Claims, 2 Drawing Sheets

(51) Int. Cl.
*G02B 7/00* (2006.01)
*G02B 27/00* (2006.01)

(58) Field of Classification Search
USPC ............... 359/362, 368, 391, 395, 820, 745, 359/749–795
See application file for complete search history.

(56) References Cited

U.S. PATENT DOCUMENTS

| | | | |
|---|---|---|---|
| 5,760,967 A * | 6/1998 | Terasawa | G02B 15/173 359/684 |
| 7,505,213 B2 * | 3/2009 | Tsutsumi | G02B 15/173 359/684 |
| 7,561,202 B2 | 7/2009 | Goto | |
| 2003/0142209 A1 | 7/2003 | Yamazaki et al. | |

FOREIGN PATENT DOCUMENTS

| | | |
|---|---|---|
| JP | 11223757 A | 8/1999 |
| JP | 2002006194 A | 1/2002 |
| JP | 2011039352 A | 2/2011 |

OTHER PUBLICATIONS

Japanese Office Action, Japanese Patent Application No. 2011-134098, dated Feb. 3, 2015.

\* cited by examiner

ZOOM LENS DEVICE

CROSS REFERENCE TO RELATED APPLICATION

This application is a continuation application of application Ser. No. 13/157,649, filed Jun. 10, 2011, the disclosure of which is hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

TECHNICAL FIELD

The present invention relates to a zoom lens device capable of correcting defocus caused by an ambient temperature change in a simple manner, and more particularly to a zoom lens device capable of correcting defocus caused by an ambient temperature change in a simple manner even if the device includes a preset mechanism.

BACKGROUND ART

A lens system of a zoom lens device used for a surveillance video camera typically includes a focusing lens group and a variator lens group (Patent Document 1 and Patent Document 2). Lens systems having a four-group configuration including a focusing lens group, a variator lens group, a compensator lens group, and a master lens group arranged in this order from the object side are actually used widely. Since near infrared light is used for the illumination for surveillance at night, fluoric lenses or ED lenses are used for these lens systems in order to minimize aberration between visible light and near infrared light.

Some lens devices used in surveillance video cameras include a preset mechanism. The positions of the focusing lens group and variator lens group for taking an image of a predetermined location to be imaged with a predetermined magnification are determined in advance, and the focusing lens group and variator lens group are adjusted to these positions predetermined by the preset mechanism when an image of that location is actually taken. To prevent defocusing caused by an ambient temperature change in a zoom lens device equipped with such a preset mechanism, Japanese Patent Application Laid-Open No. Hei 11-205655 proposes providing a temperature sensor to the zoom lens device and separately correcting the positions of the focusing lens group and variator lens group on the basis of an initially set temperature and a current temperature.

PRIOR ART DOCUMENTS

Patent Documents

Patent Document 1: JP 11-205655 A
Patent Document 2: JP 11-64713 A

SUMMARY OF THE INVENTION

Problems to be Solved by the Invention

With the conventional correcting mechanism for dealing with ambient temperature changes in the zoom lens device, correction amounts need to be calculated for the respective positions along the optical axis of the focusing lens and the zoom lens in accordance with the ambient temperature, and the positions preliminarily determined by the preset mechanism of the focusing lens and zoom lens need to be changed. The correcting mechanism is therefore complex.

In view of the above, an object of the present invention is to provide a zoom lens device capable of favorably correcting defocus in a lens system caused by an ambient temperature change with a simple correcting mechanism.

Means for Solving the Problems

The present inventors have found out the following with regard to defocus caused by an ambient temperature change in high magnification zoom lens devices:

(i) In a high magnification zoom lens device with a long focal length, a change in shape caused by an ambient temperature change around the focusing lens group on the long focal length side largely affects focusing of the entire zoom lens device. If the zoom lens device has a four-group configuration, in particular, a change in shape of the focusing lens group largely affects focusing of the entire zoom lens device, while a change in shape of the master lens group, variator lens group, or compensator lens group has less impact;

(ii) On the other hand, on the short focal length side, a change in shape of the focusing lens group does not largely affect focusing of the entire zoom lens device;

(iii) A high magnification zoom lens device used for surveillance purposes is typically used on the long focal length side for the purpose of monitoring a distant location, and therefore defocus caused by an ambient temperature change can be corrected more effectively on the long focal length side;

(iv) To correct defocus caused by an ambient temperature change on the long focal length side, correction of lens positions of the focusing lens group is essential, as discussed in (i). An effective correcting technique then would be to configure part of the focusing lens group as a temperature-based correction lens and to make this temperature-based correction lens movable separately from other lenses of the focusing lens group; and (v) An actual correction of defocus caused by an ambient temperature change around the focusing lens group using the temperature-based correction lens of (iv) confirmed that the lens positions of the other lenses of the focusing lens group need not be corrected but could be used as preliminarily determined by the preset mechanism without any problem, irrespective of the ambient temperature during actual imaging.

Accordingly, the present invention provides a zoom lens device including a focusing lens group on an object side and a variator lens next thereto, and a temperature sensor, wherein the focusing lens group includes a focusing lens, and a temperature-based correction lens for correcting a change in focal point caused by a temperature change around the focusing lens group, and wherein the temperature-based correction lens is moved by a temperature-based correction lens driving mechanism along an optical axis to a position corresponding to a temperature detected by the temperature sensor independently of the positions of the focusing lens and the variator lens group.

The invention provides an embodiment in particular of the above-described zoom lens device including a preset mechanism for focusing a predetermined location to be imaged with a predetermined magnification, wherein the temperature-based correction lens driving mechanism moves the temperature-based correction lens along the optical axis to a position corresponding to a temperature detected by the temperature sensor independently of the positions determined by the preset mechanism of the focusing lens and the variator lens group.

The invention also provides an embodiment including a focusing lens group, a variator lens group, a compensator lens group, and a master lens group arranged in this order from the object side, wherein part of the master lens group is moved by a temperature-based correction lens driving mechanism for the master lens group along the optical axis to a position corresponding to a temperature detected by the temperature sensor.

ADVANTAGES OF THE INVENTION

With the zoom lens device of the present invention, part of the focusing lens group on the object side is formed as a temperature-based correction lens, and defocus caused by an ambient temperature change around the focusing lens is corrected by moving this temperature-based correction lens. Defocus caused by an ambient temperature change on the long focal length side of a high magnification zoom lens device used for a surveillance video camera or the like is mostly attributable to defocus of the focusing lens group on the object side. Therefore, correction based on temperature of the focusing lens group can effectively eliminate defocus on the long focal length side without any correction based on temperature of other lens groups.

Accordingly, the zoom lens device of the present invention can eliminate defocus on the long focal length side caused by an ambient temperature change around the high magnification zoom lens device in actual use with a simple configuration in which only part of the focusing lens group on the object side is moved in accordance with the temperature.

If the zoom lens device includes a preset mechanism, in particular, the initially set positions of various lens groups can be used irrespective of the ambient temperature. Therefore, the preset mechanism does not need to have a temperature-based correction mechanism incorporated therein.

If the zoom lens device has a four-group lens configuration including a focusing lens group, a variator lens group, a compensator lens group, and a master lens group arranged in this order from the object side, defocus on the short focal length side caused by an ambient temperature change can also be eliminated satisfactorily in actual use by moving part of the master lens group in accordance with the temperature detected by the temperature sensor.

EMBODIMENTS FOF CARRYING OUT THE INVENTION

Figure 1:
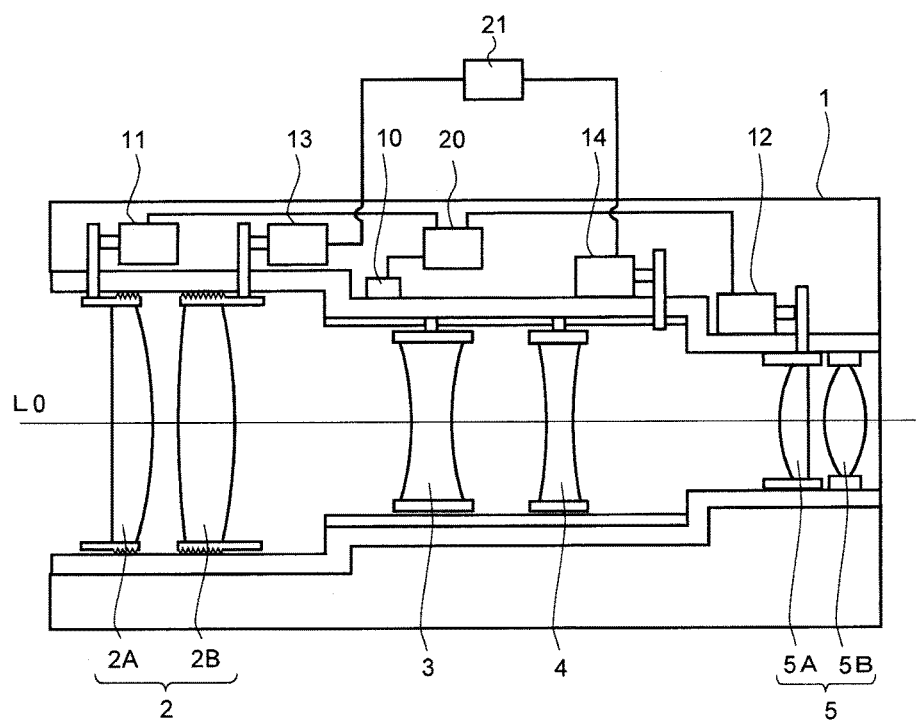
FIG. 1 is a schematic cross sectional view of a camera including a zoom lens device according to one embodiment.

Hereinafter the present invention will be described in detail with reference to the drawings. Same reference numerals in respective drawings denote same or equivalent constituent elements.

FIG. 1 is a block diagram of the zoom lens device 1 according to one embodiment of the present invention. The zoom lens device 1 of this embodiment is suitable for applications such as surveillance cameras for monitoring a distant location with a high zoom magnification.

The zoom lens device 1 has a four-group lens configuration. More specifically, the device includes a focusing lens group 2 that performs focusing, a variator lens group 3 serving to change magnification, a compensator lens group 4 that corrects a focal shift caused by displacement of the variator lens group 3, and a master lens group 5 that forms a real image from a virtual image, arranged in this order from the object side. A diaphragm (not shown) is provided between the compensator lens group 4 and master lens group 5. These focusing lens group 2, variator lens group 3, compensator lens group 4, and master lens group 5 each are formed by a combination of lenses.

Of these lenses, the focusing lens group 2 is made by an ED lens formed of extra-low dispersion glass or a fluoric lens to minimize chromatic aberration. For this reason, the focusing lens group 2 has a higher thermal expansion coefficient than those of other lens groups 3, 4, and 5 and is prone to deformation caused by an ambient temperature change, which causes the focal point to be readily changed.

A temperature sensor 10 is provided in a housing supporting the focusing lens group 2 in order to detect the ambient temperature of the focusing lens group 2.

The characteristic feature of the present invention is that, the focusing lens group 2 is made up of a temperature-based correction lens 2A for correcting a change in the focal point caused by a temperature change around the focusing lens group 2, and a focusing lens 2B that primarily serves the purpose of focusing, and that the temperature-based correction lens 2A is movable along the optical axis L0 by a temperature-based correction lens driving mechanism 11 independently of the focusing lens 2B and other lens groups than the focusing lens group 2 (i.e., the variator lens group 3, the compensator lens group 4, and the master lens group 5).

The temperature-based correction lens driving mechanism 11 includes a position control sensor, a stepping motor, and the like, and is connected to a temperature-based correction controller 20. The temperature-based correction controller 20 stores therein a predetermined corresponding relationship between the position along the optical axis L0 of the temperature-based correction lens 2A for correcting a change in the focal point caused by an ambient temperature change around the focusing lens group 2 and the temperature detected by the temperature sensor 10. This temperature-based correction controller 20 controls the temperature-based correction lens driving mechanism 11 such as to move the temperature-based correction lens 2A to a position along the optical axis L0 corresponding to a temperature detected by the temperature sensor 10 on the basis of the above-noted corresponding relationship during use of the zoom lens device 1.

Figure 2:
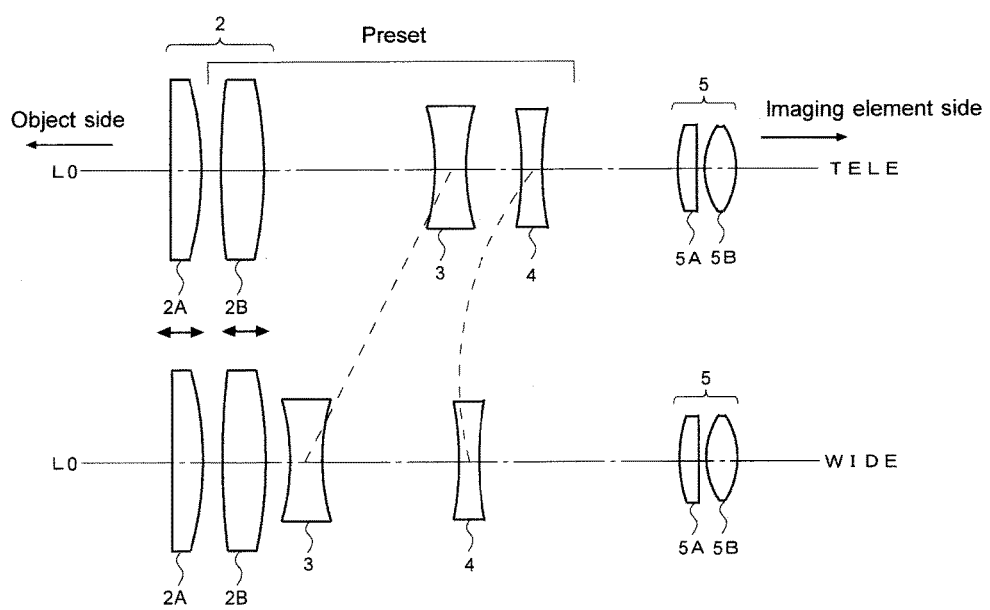
FIG. 2 is a diagram illustrating the operations of respective lens groups during a zooming operation.

The position along the optical axis L0 of the temperature-based correction lens 2A determined beforehand and stored in the temperature-based correction controller 20 is not its position relative to the focusing lens 2B but an absolute position in the focusing lens group 2. For example, when the focusing lens group 2 has a predetermined focal point at a certain temperature, such a position of the temperature-based correction lens 2A as to allow the focusing lens group 2 to maintain that focal point at given temperatures is determined with reference to a predetermined position inside the housing of the focusing lens group 2, and stored in the temperature-based correction controller 20. Meanwhile, when this focusing lens group 2 is mounted in the housing of the zoom lens device 1 with other lenses to be used as part of the zoom lens device, the focusing lens 2B moves along the optical axis L0 for the focusing as shown in FIG. 2 while the variator lens group 3 and the compensator lens group 4 are positioned between the long focal length (TELE) side and the short focal length (WIDE) side in accordance with a predetermined zoom magnification. The temperature-based correction lens 2A moves to a position along the optical axis L0 defined by the relationship with the temperature with reference to the housing of the focusing lens group 2, irrespective of the positions of these focusing lens 2B, variator lens group 3, and compensator lens group 4.

In the zoom lens device of the present invention, the focusing lens 2B, the variator lens group 3, the compensator lens group 4, and the master lens group 5 may be configured similarly to a known zoom lens with a four-group configuration. In the zoom lens device 1 of this embodiment, however, the master lens group 5 is made up of a temperature-based correction lens 5A similarly to the temperature-based correction lens 2A of the focusing lens group 2 described above and another lens 5B, and the temperature-based correction lens 5A is able to move independently of the other lens 5B.

A driving mechanism 12 for the temperature-based correction lens 5A of the master lens group 5 also includes a position control sensor, a stepping motor, and the like, and is connected to the temperature-based correction controller 20. As with the case with the temperature-based correction lens 2A of the focusing lens group 2 described above, a predetermined corresponding relationship is registered in the temperature-based correction controller 20, the corresponding relationship being between the position along the optical axis L0 of the temperature-based correction lens 5A for correcting a change in the focal point caused by an ambient temperature change around the master lens group 5 and the temperature detected by the temperature sensor 10. The temperature-based correction controller 20 controls the driving mechanism 12 such as to move the temperature-based correction lens 5A to a position along the optical axis L0 determined by a temperature detected by the temperature sensor 10 on the basis of this corresponding relationship.

Since defocus on the short focal length side caused by an ambient temperature change is largely affected by defocus of the master lens group 5, such defocus on the short focal length side caused by an ambient temperature change can be substantially eliminated by configuring part of the master lens group 5 as a temperature-based correction lens 5A and moving the same in accordance with the temperature detected by the temperature sensor 10. Such a temperature-based correction mechanism of the master lens group 5 in the present invention is provided depending on the needs of use, etc. of the zoom lens device 1.

Meanwhile, the zoom lens device 1 of this embodiment includes a driving mechanism having a preset mechanism mounted to the focusing lens 2B, the variator lens group 3, and the compensator lens group 4. More specifically, these lenses are mounted on a cylindrical member formed with cam grooves such as to be movable along the optical axis L0. The variator lens group 3 and the compensator lens group 4 in such a configuration are mechanically linked to each other and disposed either on the TELE side or WIDE side as shown in FIG. 2.

A focusing lens driving mechanism 13 having a position control sensor and a stepping motor is mounted to the focusing lens 2B. A zoom driving mechanism 14 having a position control sensor and a stepping motor is also mounted to the variator lens group 3 and compensator lens group 4.

These driving mechanisms 13 and 14 are connected to a preset controller 21 that controls the presetting.

The preset controller 21 sets preset values. Namely, the positions the respective lenses need to take along the optical axis L0 to image a predetermined location to be imaged with a predetermined imaging magnification are preliminarily determined and stored in the preset controller 21. A pan/tilt driving mechanism for controlling the movement in the horizontal direction (pan) and vertical direction (tilt) of the zoom lens device 1 is also connected to the preset controller 21, and pan/tilt angles required for the imaging of the location to be imaged in a predetermined direction are stored in the preset controller 21.

When an image of the predetermined location to be imaged is actually taken, the zoom lens device 1 is oriented toward the preset direction, and the focusing lens 2B, the variator lens group 3, and the compensator lens group 4 inside the zoom lens device move to preset positions by the control of the preset controller 21.

Next, how the zoom lens device 1 of FIG. 1 is used will be described.

Step 1

First, as an initial setting, a corresponding relationship between positions the temperature-based correction lens 2A needs to move to for correcting changes in the focal point caused by temperature changes around the focusing lens group 2 and ambient temperatures is stored in the temperature-based correction controller 20 of the zoom lens device 1. A corresponding relationship between positions the temperature-based correction lens 5A needs to move to for correcting changes in the focal point caused by temperature changes around the master lens group 5 and ambient temperatures is also stored in the temperature-based correction controller 20.

Step 2

The zoom lens device 1 is mounted to a camera. When an image is taken, the temperature-based correction lens driving mechanism 11 controlled by the temperature-based correction controller 20 described above is driven, to move the temperature-based correction lens 2A to a position corresponding to the temperature detected by the temperature sensor 10 when the image is taken on the basis of the corresponding relationship between the position of the temperature-based correction lens 2A and the ambient temperature. Similarly, the temperature-based correction lens driving mechanism 12 of the master lens group 5 is driven by the temperature-based correction controller 20, to move the temperature-based correction lens 5A of the master lens group 5 to a position corresponding to the temperature detected by the temperature sensor 10 when the image is taken.

Step 3

Next, when setting a preset value with respect to a predetermined location to be imaged, the positions of the temperature-based correction lens 2A of the focusing lens group and the temperature-based correction lens 5A of the master lens group are separately corrected as described above in step 2. The positions which the focusing lens group 2 (more specifically, focusing lens 2B), the variator lens group 3, the compensator lens group 4, and the master lens group 5 should take in order to image the predetermined location to be imaged with a predetermined magnification are determined, and stored in the preset controller 21 that controls the presetting function. Such setting of preset values can be done for a plurality of locations to be imaged.

Step 4

When an image of the preset location to be imaged is actually taken, the positions of the temperature-based correction lens 2A of the focusing lens group 2 and the temperature-based correction lens 5A of the master lens group 5 are separately corrected as described above in step 2. Then the focusing lens group 2, the variator lens group 3, the compensator lens group 4, and the master lens group 5 are moved to preset positions, respectively.

As described above, with the zoom lens device of the present invention, when an image is taken with the zoom lens device 1, defocus caused by a temperature change around the focusing lens group 2 is corrected by the movement of the temperature-based correction lens 2A. The position thus corrected of the temperature-based correction lens 2A is determined by the corresponding relationship between the position the temperature-based correction lens 2A needs to take for the correction and the ambient temperature thereof obtained in Step 1, and does not depend on the positions of the focusing lens 2B, the variator lens group 3, and the like during use of the zoom lens device 1.

Accordingly, defocus caused by a temperature change around the zoom lens device 1 can be corrected with a simple mechanism. Even if there is a difference in the ambient temperature when the preset values were set and the ambient temperature when an image is actually taken, it is only necessary to adjust the focusing lens group 2 (more specifically, focusing lens 2B), the variator lens group 3, and the like to respective preset positions in actual imaging, and troublesome work such as resetting the preset values in accordance with the ambient temperature is not necessary.

The correction using the temperature-based correction lens 2A as described above is particularly effective when the zoom lens device 1 having a high magnification, specifically, a high magnification of 20 times or more, preferably 34 times or more, is on the long focal length side. It is effective to use the temperature-based correction lens 5A of the master lens group 5 on the short focal length side. If the zoom lens device is mounted on a surveillance camera or the like, however, since such a camera is generally used on the long focal length side with a high magnification more often, the temperature-based correction lens 5A of the master lens group 5 may only be provided depending on needs. The temperature correction technique using the master lens group 5 is not restricted to using part of the master lens group 5 as the temperature-based correction lens 5A as described above, and the position of the entire master lens group 5 may be changed for the correction. In this case, correction is achieved by preliminarily obtaining a corresponding relationship between the position of the master lens group 5 at which defocus caused by an ambient temperature change can be reduced or eliminated and the ambient temperature thereof.

The zoom lens device 1 of the present invention is not restricted to the example described above and may take various other forms. For example, while the temperature-based correction lens 2A should preferably be the one of the lenses forming the focusing lens group 2 located on the object side, it may be the lens located on the variator lens group 3 side.

The variator lens group 3 and the compensator lens group 4 may have a separate driving mechanism so that their positions are adjustable independently from each other.

Further, the zoom lens device 1 may have other lens configuration than the four-group configuration.

INDUSTRIAL APPLICABILITY

The zoom lens device 1 of the present invention can be mounted to various cameras for various purposes such as surveillance video cameras and domestic video cameras. The device is particularly useful in surveillance cameras in which a preset mechanism is commonly used and which requires a high magnification zooming function, and in which fluoric lenses or ED lenses are used so that images can be taken not only during the day but also at night.

DESCRIPTION OF THE REFERENCE NUMERALS

1 zoom lens device
2 focusing lens group
2A temperature-based correction lens
2B focusing lens
3 variator lens group
4 compensator lens group
5 master lens group
5A temperature-based correction lens
5B another lens
10 temperature sensor
11 temperature-based correction lens driving mechanism
12 driving mechanism
13 focusing lens driving mechanism
14 zoom driving mechanism
20 temperature-based correction controller
21 preset controller
L0 optical axis

What is claimed is:
1. A zoom lens device comprising a focusing lens group on an object side and a variator lens group next thereto, and a temperature sensor,
   wherein the focusing lens group includes a focusing lens and a temperature-based correction lens as part of the focusing lens group, the temperature-based correction lens being located closest to an object in the focusing lens group for correcting a change in focal point caused by a temperature change around the focusing lens group,
   wherein the zoom lens device further comprises a temperature-based correction lens driving mechanism for moving the temperature-based correction lens independently of the positions of the focusing lens and the variator lens group, and a temperature-based correction controller, and
   wherein the temperature-based correction lens is moved separately from the focusing lens of the focusing lens group by the temperature-based correction lens driving mechanism along an optical axis to a position corresponding to a temperature detected by the temperature sensor without any correction based on temperature of positions of the focusing lens and the variator lens group, based on a corresponding relationship between a position of the temperature-based correction lens for correcting a change in focal point caused by an ambient temperature change around the focusing lens group and an ambient temperature detected by the temperature sensor, the corresponding relationship being stored in the temperature-based correction controller as an initial setting.

2. The zoom lens device according to claim 1, comprising a preset mechanism for focusing a predetermined location to be imaged with a predetermined magnification, and wherein the temperature-based correction lens driving mechanism moves the temperature-based correction lens along the optical axis to a position corresponding to a temperature detected by the temperature sensor without any correction based on temperature of the positions determined by the preset mechanism of the focusing lens and the variator lens group.

3. The zoom lens device according to claim 1, wherein the position of the temperature-based correction lens during use of the zoom lens device determined on the basis of the relationship between the position of the temperature-based correction lens and the ambient temperature is determined with reference to a predetermined location inside a housing of the focusing lens group.

* * * * *